United States Patent [19]

Senshu et al.

[11] Patent Number: 5,502,608
[45] Date of Patent: Mar. 26, 1996

[54] TAPE CASSETTE

[75] Inventors: Yoichirou Senshu; Shuichi Ota, both of Kanagawa; Hiroshi Fujii; Akihiro Uetake, both of Tokyo; Takashi Sawada, Kanagawa; Shinichi Hasegawa, Chiba; Kazuyoshi Suzuki, Tokyo; Tetsuro Morii, Chiba, all of Japan

[73] Assignee: Sony Corporation, Tokyo, Japan

[21] Appl. No.: 314,368

[22] Filed: Sep. 28, 1994

Related U.S. Application Data

[63] Continuation of Ser. No. 19,841, Feb. 19, 1993, abandoned.

[30] Foreign Application Priority Data

Feb. 27, 1992 [JP] Japan .................................. 4-075693

[51] Int. Cl.$^6$ .................................................. G11B 23/02
[52] U.S. Cl. .................................................. 360/132
[58] Field of Search .................................. 360/132, 131; 242/188, 198

[56] References Cited

U.S. PATENT DOCUMENTS 5,438,471  8/1995  Sawada et al. ........................ 360/132

FOREIGN PATENT DOCUMENTS 0502505  9/1992  European Pat. Off. ............... 360/137
61-11980  1/1986  Japan .................................. 360/132
234476  9/1988  Japan .................................. 360/132
4132063  5/1992  Japan .................................. 360/132

Primary Examiner—Stuart S. Levy
Assistant Examiner—Allen Cao
Attorney, Agent, or Firm—William S. Frommer; Alvin Sinderbrand

[57] ABSTRACT

In a tape cassette having a case with a mouth for receiving a magnetic head drum of a recording/reproducing apparatus and containing a recording tape wound on rotatable reels and including a tape run extending across the mouth; a front lid is pivotally supported on side walls of the case so as to be movable between a closed position covering a front opening of the mouth and opened position to uncover the tape run, and upper lid is pivotally joined at its front edge to the upper edge portion of the front lid so as to be movable between a closed position to covering a top opening of the mouth and opened position to uncover the top opening, and a slide shutter is supported on the case for sliding between a closed position covering a bottom opening of the mouth and opened position to uncover such bottom opening. The mouth across which a run of the recording tape extends can be closely covered by the front lid, the upper lid and the slide shutter when the tape cassette is not in use. When the tape cassette is in use, the mouth is fully opened in response to the movements of the front lid, upper lid and slide shutter to this opened position so as to enable the magnetic head drum to advance deep into the mouth.

9 Claims, 8 Drawing Sheets

F I G. 7A
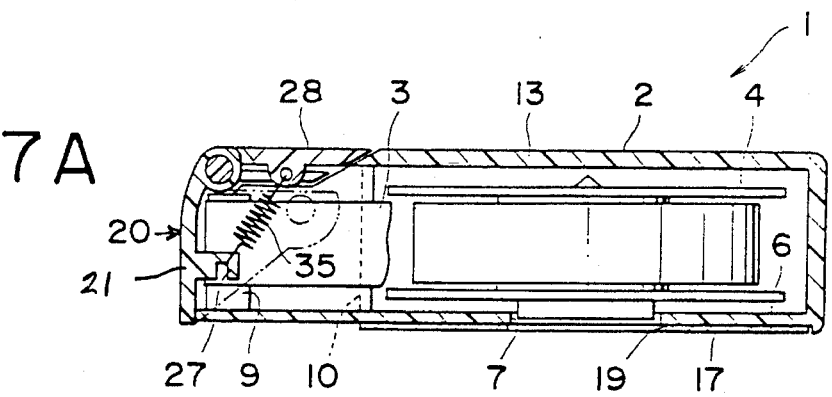
F I G. 7B
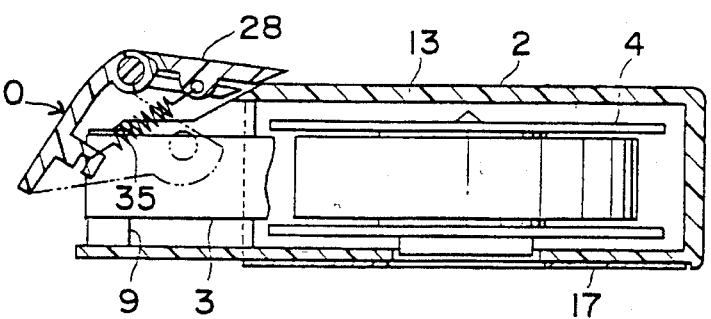
F I G. 7C
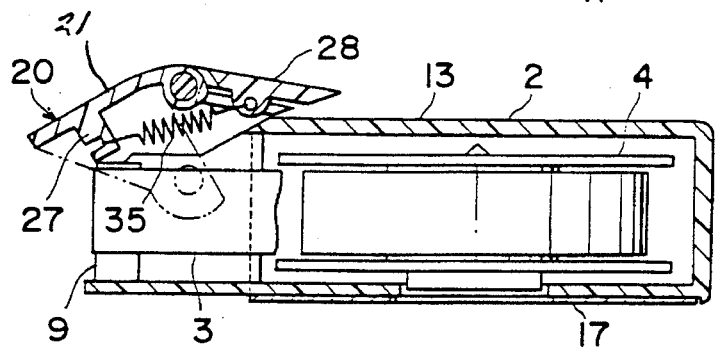
F I G. 7D
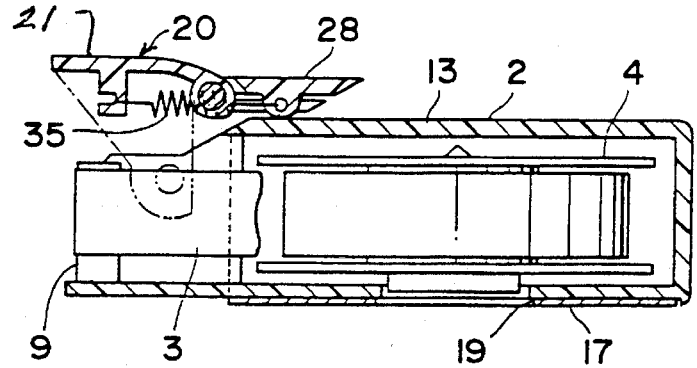

TAPE CASSETTE

This application is a continuation of application Ser. No. 08/019,841, filed Feb. 19, 1993 (now abandoned).

BACKGROUND OF THE INVENTION

1. Field of the Invention

The present invention relates to a tape cassette and, more specifically, is directed to a tape cassette of the type having a mouth for receiving a head drum and tape loading members when the tape cassette is inserted in a recording and/or reproducing apparatus, and which is capable of being tightly closed when the tape cassette is not in use.

2. Description of the Related Art

An existing tape cassette for use in a digital audio tape player (DAT) has a mouth and is provided with a front lid for closing the front opening of the mouth and a slide shutter for closing the lower opening of the mouth. In this tape cassette for a DAT, an extension of the top wall of the case or body of the cassette extends across the top of the mouth for closing the latter from above. Accordingly, the position of the tape cassette must be raised when it is desired to receive the head drum in the mouth of the tape cassette for reducing the size of the recording and/or reproducing apparatus measured laterally and from front-to-back. Consequently, the height of the recording and/or reproducing apparatus has to be increased. On the other hand, if the height of the recording and/or reproducing apparatus is not increased, the head drum needs to be located outside the mouth of the cassette case and, consequently, the size of the recording and/or reproducing apparatus, as measured in the front-to-back direction, has to be increased.

OBJECTS AND SUMMARY OF THE INVENTION

Accordingly, it is an object of the present invention to provide a tape cassette with a mouth for receiving the magnetic head drum of a recording/reproducing apparatus when the tape cassette is inserted in the recording/reproducing apparatus, and with structures for closing the mouth when the cassette is not in use, and in which such closing structures, when opened, permit deep penetration of the head drum into the mouth so that the recording/reproducing apparatus can be of relatively small size, as measured laterally and from front-to-back without unduly increasing the height of the apparatus.

In accordance with an aspect of this invention, a tape cassette comprises a case having parallel, substantially planar top and bottom walls and side walls extending therebetween and a mouth in a front portion of the case with openings to the mouth at the front, top and bottom of the case; tape reels rotatable in the case and having a recording tape wound on the reels and a run of the tape between the reels extending across the mouth; a front lid pivoted on the side walls for movements in an arcuate path relative to the case between a closed position in which the front lid extends substantially normal to the top and bottom walls of the case and covers the opening at the front of the case for protecting the tape run extending across the mouth when the tape cassette is not in use, and an opened position in which the front lid is substantially parallel to the top wall and is raised and rearwardly displaced in respect to the closed position of the front lid for uncovering the opening at the front of the case and thereby providing access to the tape when the tape cassette is in use; a slide shutter slidably supported on the case for sliding movement parallel to the bottom wall between a closed position at which the shutter covers the opening at the bottom of the case when the front lid is in its closed position, and an opened position in which the shutter uncovers the opening at the bottom of the case when the front lid is in its opened position; an upper lid having a front edge portion pivotally joined to the front lid at an edge portion of the front lid which is at the top thereof in the closed position of said front lid; and guiding means for the upper lid moving the latter to a closed position flush with the top wall of the case and with a back edge of the upper lid being contiguous with a front edge of a top wall so as to cover the opening at the top of the case when the front lid is moved to its closed position, such guiding means directing the upper lid to an opened position extending over the top wall for uncovering the opening at the top of the case when the front lid is moved to its opened position. Accordingly, the mouth is able to receive the magnetic head drum without raising the position of the tape cassette in the recording/reproducing apparatus, so that the size of the recording/reproducing apparatus, as measured in a horizontal plane, can be diminished without requiring an increase in the height of the recording/reproducing apparatus, and the mouth can be tightly closed when the tape cassette is not in use.

BRIEF DESCRIPTION OF THE DRAWINGS

The above and other objects, features and advantages of the present invention will become more apparent from the following description taken in connection with the accompanying drawings, in which:

FIGS. 7A, 7B, 7C and 7D are sectional views similar to that of FIG. 5, but of a reduced scale, and to which reference will be made in explaining the movements of the front lid and the upper lid of the tape cassette of FIG. 1 from the positions thereof shown in FIG. 5;

DETAILED DESCRIPTION OF A PREFERRED EMBODIMENT

Figure 1:
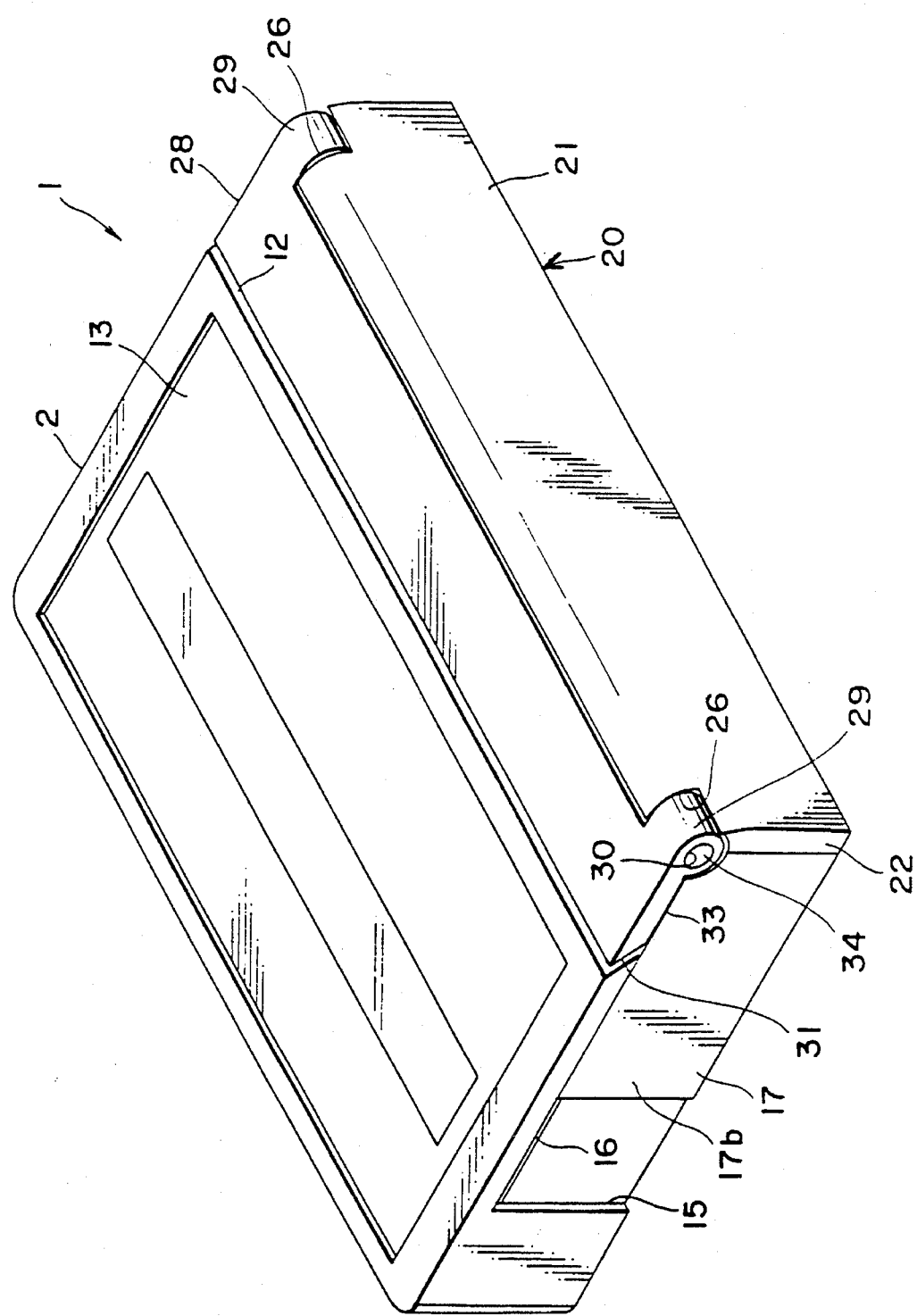
FIG. 1 is a perspective view of a tape cassette according to a preferred embodiment of the present invention, and which is shown with a slide shutter, a front lid and an upper lid in respective closed positions.

As shown in FIGS. 1 to 5, a tape cassette 1 according to a preferred embodiment of the present invention has a case or body 2 with a laterally elongate, rectangular plane shape and a relatively small thickness. Two tape reels 4 are rotatably contained in the case 2, and the opposite ends of a magnetic tape 3 are fastened to the tape reels 4, respectively. The hubs of the tape reels 4 are provided with bores 5 opening downward to receive reel tables (not shown) through holes 7 which are formed in the bottom wall 6 of the case 2 (FIGS. 4 and 5) at positions corresponding respectively to the bores 5 of the hubs of the tape reels 4.

Tape passages 8 (FIG. 2) are formed in the front portion of the case 2 adjacent the opposite sides of the case, and tape guides 9 are formed at the inner sides of the tape passages 8, respectively. A mouth 10 having openings at the front, top and bottom of the case 2 is formed between the tape passages 8 in the front portion of the case 2.

Figure 2:
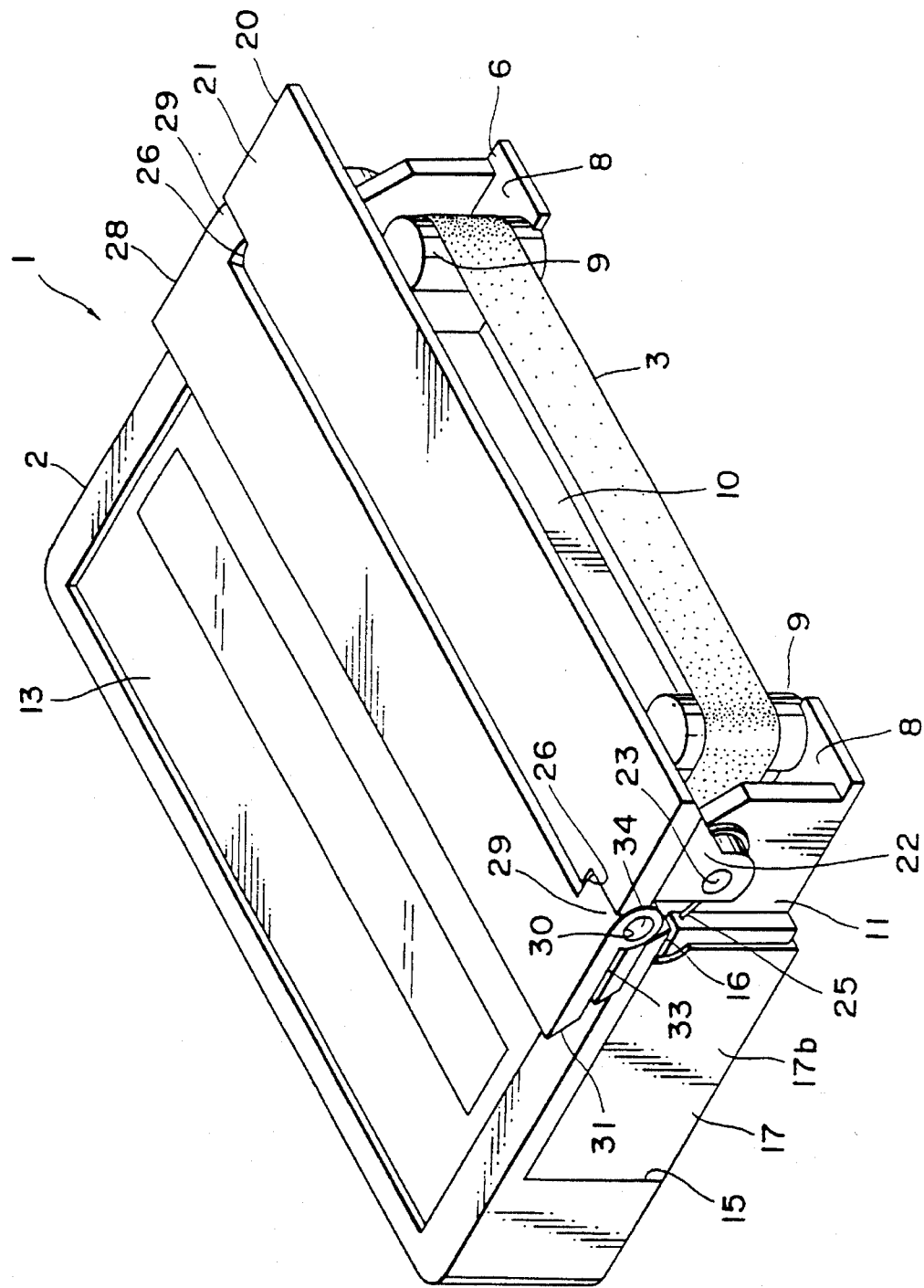
FIG. 2 is a perspective view of the tape cassette of FIG. 1, but shown with the slide shutter, front lid and upper lid in their respective open positions.
Figure 3:
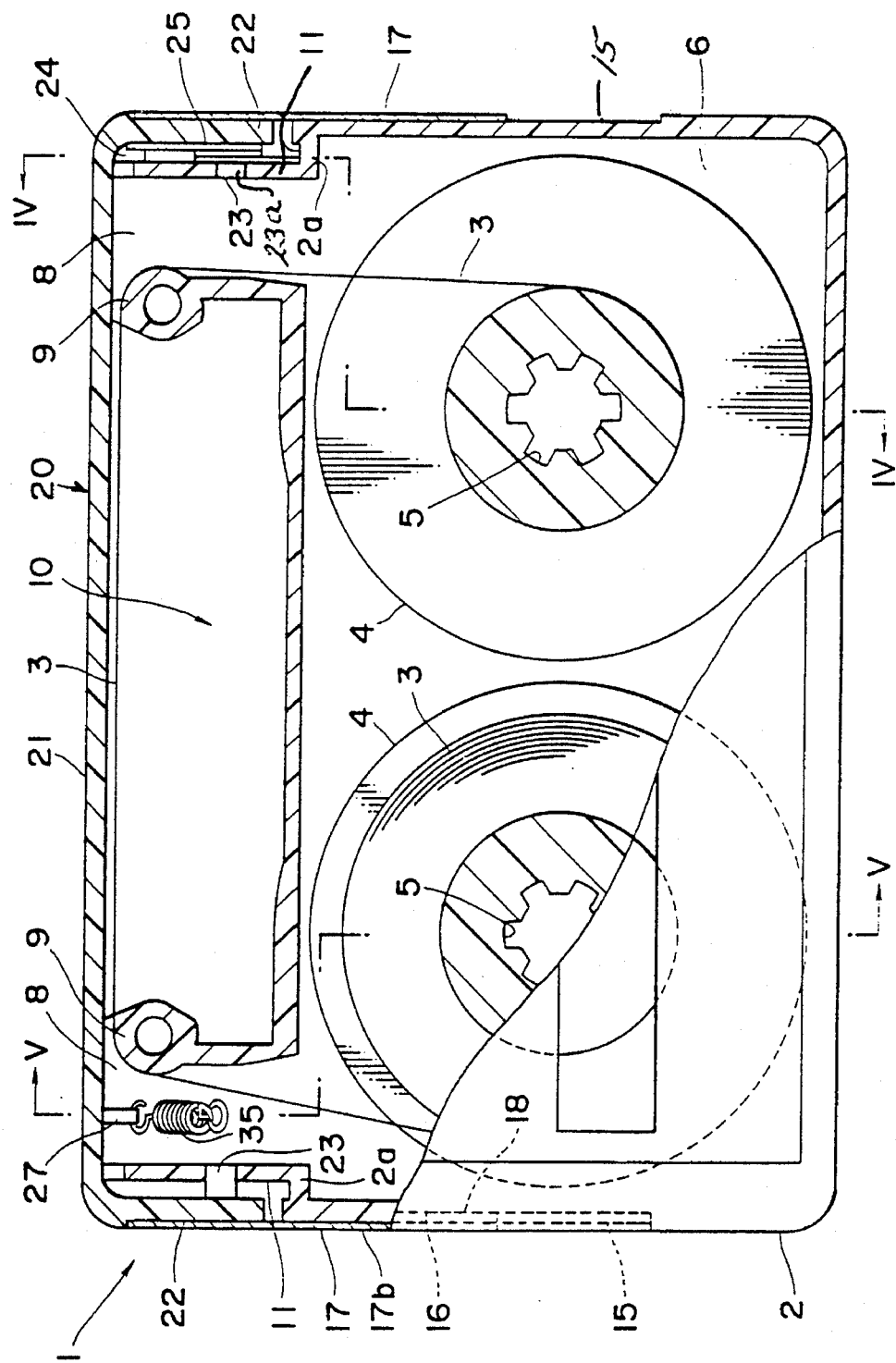
FIG. 3 is a partly cutaway plan view of the tape cassette of FIG. 1.

Front portions 11 of the side walls of the case 2 are offset toward each other, as shown on FIG. 3. A downward slope is formed on the front edge 12 of the top wall 13 of the case 2, and downwardly sloping edge portions 14 declining toward the front at an angle of about 45° are formed on the upper edges of the offset wall portions 11 which are contiguous with the front edge 12 of the top wall 13. A portion of each of the side walls of the case 2 excluding the edge of the top wall contiguous with the side wall, the offset wall portion 11 and the rear quarter portion of the side wall is recessed to form a shallow recess 15 (FIGS. 1, 2 and 3) for receiving portions of a slide shutter 17 therein. A guide groove 16 is formed in each recess 15 along the upper margin thereof.

The slide shutter 17 is formed by bending a metal sheet so as to provide a bottom wall 17a and side walls 17b extending upwardly from the opposite side edges of the bottom wall 17a. The bottom wall 17a has a length, that is, a lateral dimension, substantially equal to the distance between the bottom surfaces of the recesses 15 and a width, that is, a front-to-back dimension, equal to about two-thirds of the length of the recesses 15, and the side walls 17b each have a height substantially equal to the width of the respective recess 15. Small upper edge portions of the side walls 17b of the slide shutter 17 are bent toward each other to form slide edges or flanges 18.

When the slide shutter 17 is mounted on the case 2 the bottom wall 17a extends under the bottom wall 6 of the case 2 between the bottoms of the recesses 15 of the case body 2, and the side walls 17b are received in the recesses 15, with the slide edges or flanges 18 being slidably received in the guide grooves 16, respectively. Thus, the slide shutter 17 is able to slide longitudinally along the recesses 15 and under the bottom wall 6. The slide shutter 17 is urged resiliently toward the front by an elastic means (not shown), for example, to the closed position shown on FIG. 4, so as to close the bottom opening of the mouth 10.

A pair of laterally spaced apart through holes 19 are formed in the bottom wall 17a of the slide shutter 17. The positions of the through holes 19 are determined so that the holes 19 are displaced forwardly from the holes 7 formed in the bottom wall 6 of the case 2 when the slide shutter 17 is in its forward or closed position (FIGS. 4 and 5), and so that the through holes 19 coincide with the respective holes 7 in the bottom wall 6 to allow access to the bores 5 of the tape reels 4 from the outside when the slide shutter 17 is rearwardly moved to its open position, as shown on FIGS. 6A–6D. The slide shutter 17 may be locked in its closed position by a suitable locking mechanism (not, shown) when the tape cassette 1 is not in use, and is suitably unlocked when the tape cassette 1 is inserted in a recording and/or reproducing apparatus. The slide shutter 17 may be suitably retained in its open position by an opening mechanism (not shown) of a recording and/or reproducing apparatus intended to receive the cassette 1, and the slide shutter is released for return to its closed position when the tape cassette 1 is removed from the recording and/or reproducing apparatus.

A front lid 20 is supported pivotally on the front end of the case 2. The front lid 20 includes, as integral parts thereof, a front wall 21 dimensioned to extend across the front of the case 2, side walls 22 extending backward from the opposite end edges of the front wall 21 and pins 23 projecting inwardly toward each other from the inner surfaces of the rear end portions of the side walls 22. The pins 23 are pivotally fitted in holes or recesses 23a (FIG. 3) formed in the adjacent offset wall portions 11, respectively.

A spring peg or anchor 24 projects from one end of the inner surface of the front wall 21. A torsion coil spring 25 includes a coil mounted on one of the pins 23 and first and second arms extending from the coil and resting against the spring peg 24 and against a corner or step 2a joining the adjacent offset wall portion 11 to the remainder of the respective side wall of the case 2 to urge the front lid 20 toward the closed position for covering the front of the case 2. Recesses 26 (FIG. 1) are formed in the opposite upper corners of the front wall 21 of the front lid 20, respectively, and holes 26a (FIG. 5) are formed in the side surfaces of the recesses 26. A spring anchor 27 (FIGS. 3 and 5) projects from a lower portion of the front wall 21 adjacent the end thereof which is opposite the end on which the spring peg 24 is formed.

Figure 4:
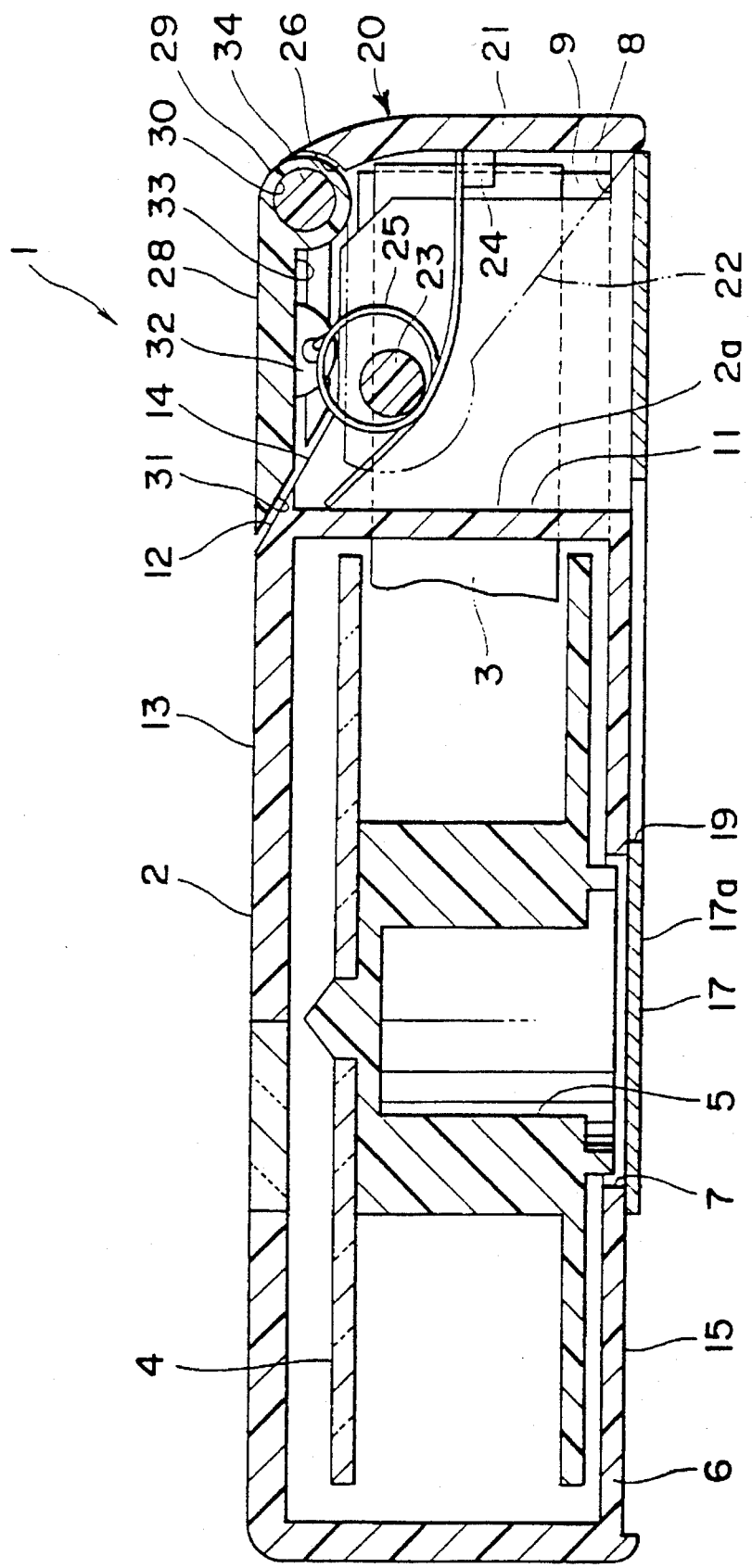
FIG. 4 is an enlarged sectional view taken on the line IV—IV in FIG. 3.
Figure 5:
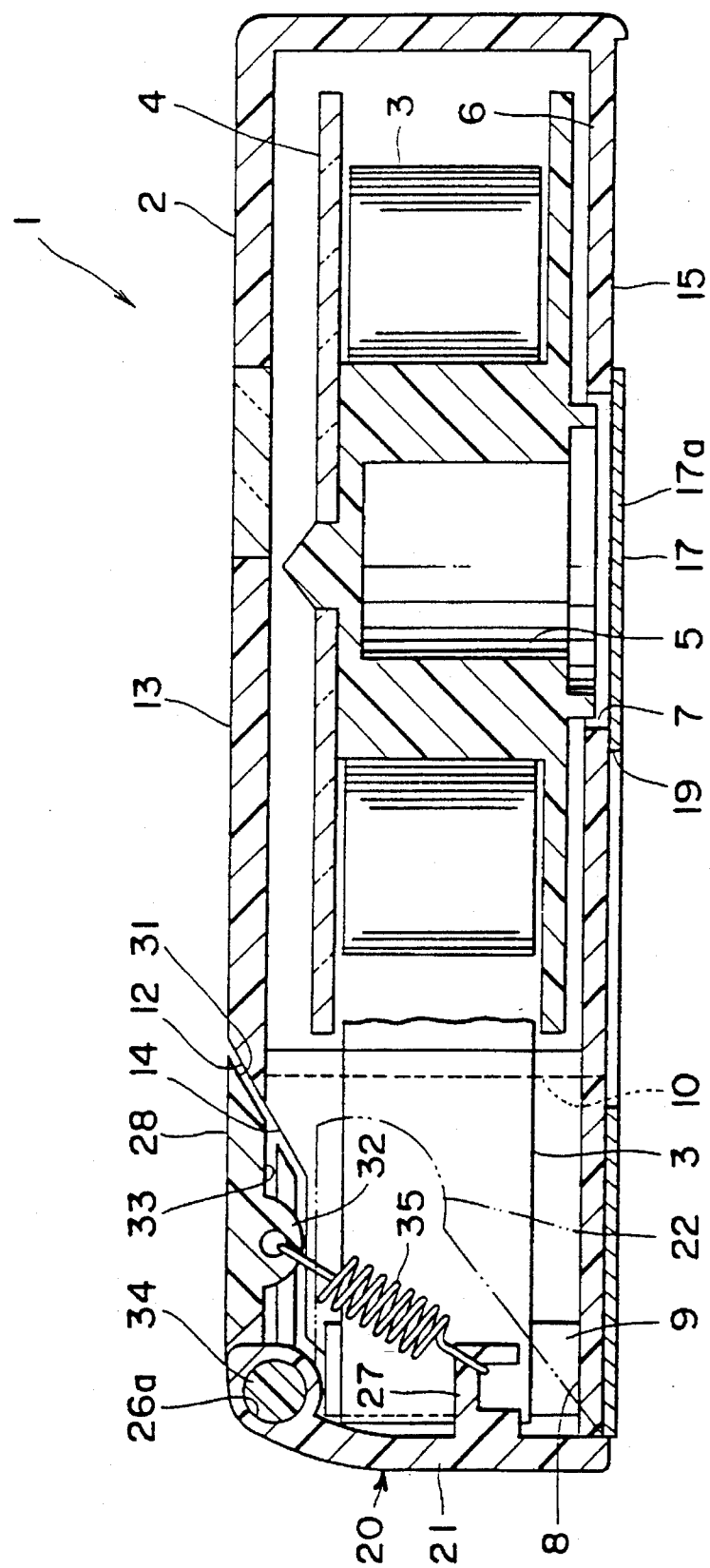
FIG. 5 is an enlarged sectional view taken on the line V—V in FIG. 3.

An upper lid 28 having the shape of a laterally elongated plate is provided integrally with knuckles 29 having through holes 30 and projecting forwardly from the front edge of the upper lid 28 at opposite ends of the same (FIGS. 1 and 2). The rear edge 31 of the upper lid 28 is inclined upward or bevelled with an inclination of about 45° as shown particularly on FIGS. 4 and 5. A spring anchor 32 projects from the under surface of the upper lid 28 adjacent one end of the latter. Longitudinal grooves 33 are formed in outwardly facing side surfaces of the upper lid 28 (FIGS. 2, 3, and 4). The rear ends of the grooves 33 are open and the front ends of the same terminate slightly before the front edge of the upper lid 28.

The knuckles 29 of the upper lid 28 are placed in the recesses 26 of the front lid 20, and pins 34 are inserted with a friction fit in the through holes 30 of the upper lid 28 and the inner ends of the pins 34 are loosely pivoted in the holes 26a formed in the sides of the recesses 26, thereby to enable the upper lid 28 to turn relative to the front lid 20.

A tension spring 35 (FIG. 5) is extended between the spring anchor 27 on the front lid 20 and the spring anchor 32 on the upper lid 28 to bias the upper lid 28 pivotally downward about the pins 34 in respect to the front wall 21 of the front lid 20. When the front lid 20 is in its closed position for covering the front side of the magnetic tape 3 extending across the mouth 10, the upper lid 28 is at its closed position with the inclined or bevelled edge 31 of the upper lid 28 overlapping the inclined front end edge 12 of the top wall 13 and the sloping edges 14 of the case 2, to close the top opening of the mouth 10.

When the upper lid 28 is in its closed position, the grooves 33 in the side surfaces of the upper lid 28 are continuations of, and in alignment with the guide grooves 16 formed in the side walls of the case 2. In the foregoing state, the front portions of the slide flanges 18 on the shutter 17 are engageable in the grooves 33 of the upper lid 28 for locking the upper lid in its closed position.

Figure 6A:
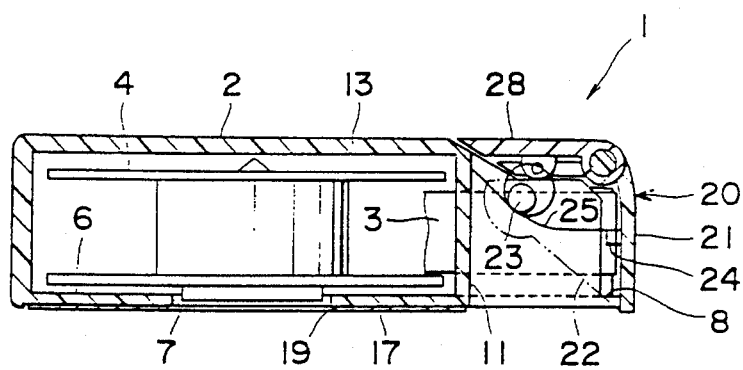
FIGS. 6A, 6B, 6C and 6D are sectional views similar to that of FIG. 4, but of a reduced scale, and to which reference will be made in explaining movements of the front lid and upper lid included in the tape cassette of FIG. 1 from the positions thereof shown in FIG. 4.
Figure 6B:
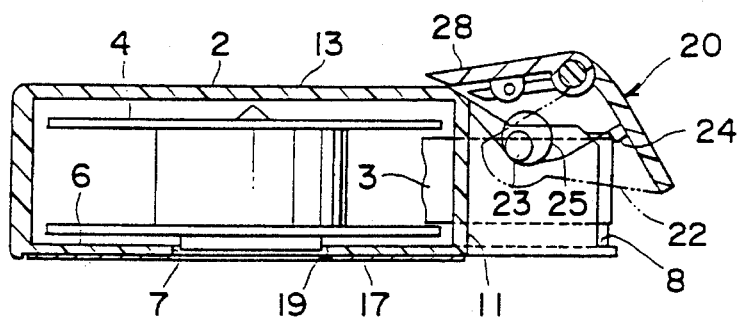
Figure 6C:
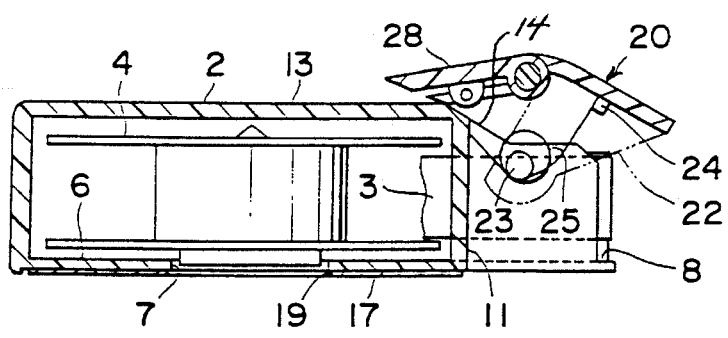
Figure 6D:
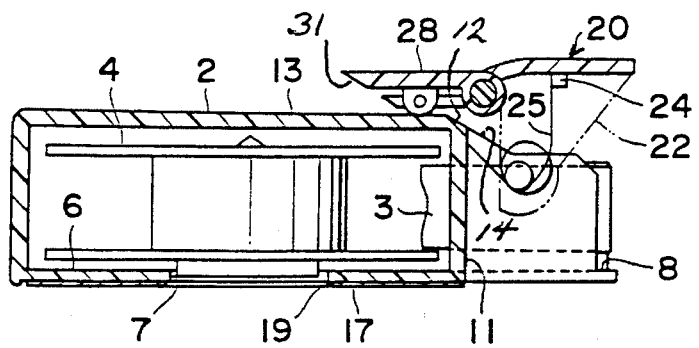

When the tape cassette 1 is inserted, for example, in the cassette holder of a recording and/or reproducing apparatus, the slide shutter 17 is retracted to its open position and the slide flanges 18 move out of the grooves 33 to release the upper lid 28. As the front lid 20 is turned about the pins 23 toward its open position, the pins 34 are moved upwardly and rearwardly about an axis passing through the centers of the pins 23 and the inclined edge 51 of the upper lid 28 slides obliquely upward along the sloping edges 12 and 14, as shown in FIGS. 6B, 6C, 7B and 7C. When the front lid 20 reaches its fully open position, the front end of the upper lid 28 is at a position corresponding to the middle of each sloping edge 14 and extends over the top wall 13 of the case 2 to uncover the top opening of the mouth 10. In this state, the front wall 21 of the front lid 20 is located horizontally far above the mouth 10, as is shown in FIGS. 6D and 7D.

Figure 8:
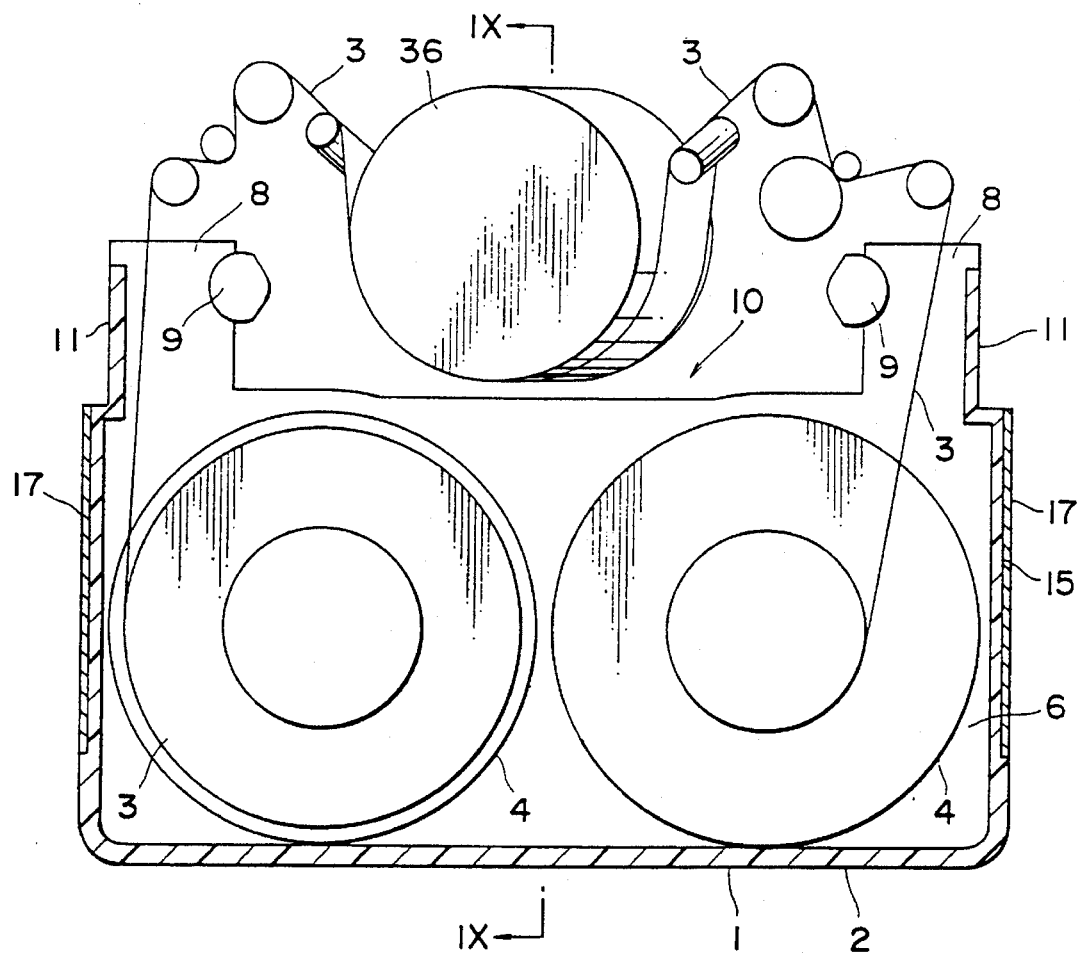
FIG. 8 is a schematic sectional view of the tape cassette of FIG. 1 with a head drum shown received in a mouth of the tape cassette.
Figure 9:
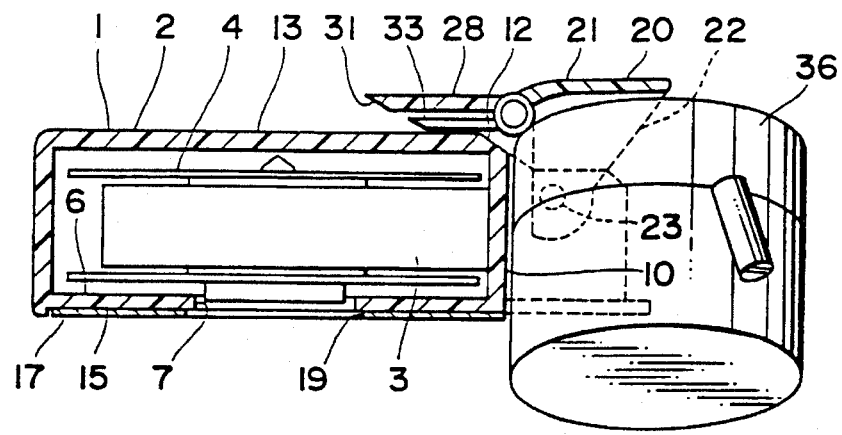
FIG. 9 is a sectional view taken on line IX—IX in FIG. 8.

Accordingly, as shown in FIGS. 8 and 9, a magnetic head drum 36 of a recording and/or reproducing apparatus can advance upwardly deep into the mouth 10 without the need to raise the top of the tape cassette 1 in the recording and/or reproducing apparatus, which contributes to miniaturization of the recording and/or reproducing apparatus.

When the front lid 20 is turned from its open position toward the closed position, the upper lid 28 moves toward the front and downwardly, and the front lid 20 and the upper lid 28 reach their closed positions simultaneously. When the tape cassette 1 is then removed from the cassette holder, the slide shutter 17 slides toward the front relative to the case 2, and the slide flanges 18 engage in the grooves 33 of the upper lid 28 to lock the upper lid in its closed position.

As is apparent from the foregoing description, the mouth 10 of the tape cassette is covered closely by the front lid 20, the slide shutter 17 and the upper lid 28 when the tape cassette is not in use, and the upper lid 28 is shifted to its open position to uncover the upper opening of the mouth 10 in response to opening of the front lid 20 when the tape cassette is in use. Accordingly, the magnetic head drum of the recording and/or reproducing apparatus is able to advance deep into the mouth from below without increasing the height of the tape cassette in the recording and/or reproducing apparatus. Thus, the record and/or reproducing apparatus can be of a relatively small size measured laterally and from front-to-back without increasing the height of the apparatus, and the mouth of the tape cassette is tightly closed when the tape cassette is not in use so as to avoid contamination or other damage to the tape.

Although an illustrative embodiment of the invention has been described in detail herein with reference to the drawings, it will be understood that the invention is not limited to that embodiment, and that various changes and modifications may be effected therein by one skilled in the art without departing from the scope and spirit of the invention as defined in the appended claims.

What is claimed is:

1. A tape cassette comprising:

a case including top and bottom walls and side walls extending therebetween, said case having a mouth in a front portion of said case with said mouth having openings at the front, top and bottom of said front portion of the case;

tape reels rotatable in said case;

a recording tape wound on said reels and including a tape run between said reels which extends across said mouth;

a front lid pivoted on said side walls of the case for movements in an arcuate path relative to said case between a closed position of said front lid in which said front lid covers said opening at the front of said front portion of the case for protecting said tape run extending across said mouth when the tape cassette is not in use, and an opened position of the front lid displaced upwardly and rearwardly from said closed position of the front lid for uncovering said opening at the front of said front portion of the case and thereby providing access to said tape therethrough when the tape cassette is in use;

a slide shutter slidably supported on said side walls of the case for rectilinear sliding movement relative to said case between a closed position of said slide shutter at which said shutter covers said opening at the bottom of said front portion of the case when said front lid is in said closed position of the front lid, and an opened position of said slide shutter displaced rearwardly from said closed position of the slide shutter and in which said slide shutter uncovers said opening at the bottom of said front portion of the case when the front lid is in said opened position of the front lid;

an upper lid having a front edge portion pivotally joined to said front lid at an edge portion of the front lid which is at the top thereof in said closed position of said front lid;

guiding means for said upper lid moving the latter to a closed position of the upper lid in which said upper lid is flush with said top wall of the case and in which a back edge of said upper lid is contiguous with a front edge of said top wall so as to cover said opening at the top of said front portion of the case when said front lid is moved to said closed position of the front lid, said guiding means moving said upper lid to an opened position of the upper lid in which said upper lid overlies said top wall of the case for uncovering said opening at the top of said front portion of the case in response to movement of said front lid to said opened position of the front lid; and cooperative means on said upper lid and said slide shutter for locking said upper lid in said closed position of the upper lid in response to forward movement of said slide shutter from said opened position of the slide shutter to said closed position of the slide shutter.

2. A tape cassette according to claim 1; wherein said guiding means includes elastic means.

3. A tape cassette according to claim 1; further comprising spring means for urging said front lid toward its closed position.

4. A tape cassette according to claim 1; wherein said guiding means includes at least a portion of said front edge of said top wall of the case inclined downwardly toward the front, and at least a portion of said back edge of the upper lid inclined upwardly toward the back and being slidably engageable with said downwardly inclined portion of said front edge during movement of said front lid between said closed and opened positions of the front lid.

5. A tape cassette according to claim 1; wherein said side walls of the case have guide grooves extending therealong, said slide shutter has flanges slidably engaging in said guide grooves for guiding said slide shutter in said movement between said closed and opened positions of the slide shutter, said upper lid has side surfaces with grooves therein which are aligned with, and contiguous to said guide grooves in the side walls of said case when said upper lid is in its closed position, and said flanges of the slide shutter extend into said grooves in the side surfaces of said upper lid when said slide shutter and upper lid are in their respective closed positions so that said flanges of the slide shutter and said grooves in the side surfaces of the upper lid constitute said means for locking said upper lid in its closed position.

6. A tape cassette comprising:

a case including parallel, substantially planar top and bottom walls and side walls extending therebetween, said case having a mouth in a front portion of said case with said mouth having openings at the front, top and bottom of said front portion of the case;

tape reels rotatable in said case;

a recording tape wound on said reels and including a tape run between said reels which extends across said mouth;

a front lid pivoted on said side walls of the case for movements in an arcuate path relative to said case between a closed position of the front lid in which said front lid extends substantially normal to said top and bottom walls of the case and covers said opening at the front of said front portion of the case for protecting said tape run extending across said mouth when the tape cassette is not in use, and an opened position of the front lid in which said front lid is substantially parallel to said top wall and is raised and rearwardly displaced in respect to said closed position of the front lid for uncovering said opening at the front of said front portion of the case and thereby providing access to said tape when the tape cassette is in use;

a slide shutter slidably supported on the side walls of said case for rectilinear sliding movement relative thereto parallel to said bottom wall between a closed position of said slide shutter at which said shutter covers said opening at the bottom of said front portion of the case when said front lid is in said closed position of the front lid, and an opened position of the slide shutter in which said shutter is displaced rearwardly from its closed position and uncovers said opening at the bottom of said front portion of the case when the front lid is in said opened position of the front lid;

an upper lid having a front edge portion pivotally joined to said front lid at an edge portion of the front lid which is at the top thereof in said closed position of said front lid;

guiding means for said upper lid moving the latter to a closed position of the upper lid in which said upper lid is flush with said top wall of the case and in which a back edge of said upper lid is contiguous with a front edge of said top wall so as to cover said opening at the top of said front portion of the case when said front lid is moved to said closed position of the front lid, said guiding means guiding said upper lid in its movement to an opened position of the upper lid in which the upper lid extends over said top wall for uncovering said opening at the top of said front portion of the case in response to movement of said front lid to said opened position of the front lid; and cooperative means on said upper lid and said slide shutter for locking said upper lid in said closed position of the upper lid in response to forward movement of said slide shutter from said opened position of the slide shutter to said closed position of the slide shutter.

7. A tape cassette according to claim 6; wherein said guiding means includes at least a portion of said front edge of said top wall of the case inclined downwardly toward the front, and at least a portion of said back edge of the upper lid inclined upwardly toward the back and being slidably engageable with said downwardly inclined portion of said front edge during movement of said front lid between said closed and opened positions of the front lid.

8. A tape cassette according to claim 7; wherein said guiding means further includes elastic means connected between said front lid and said upper lid for urging said upper lid to pivot relative to said front lid in a direction urging said back edge of the upper lid downwardly toward said top wall.

9. A tape cassette according to claim 8; wherein said side walls of the case have guide grooves extending therealong, said slide shutter has flanges slidably engaging in said guide grooves for guiding said slide shutter in said movement between said closed and opened positions of the slide shutter, said upper lid has side surfaces with grooves therein which are aligned with, and contiguous to said guide grooves in the side walls of said case when said upper lid is in its closed position, and said flanges of the slide shutter extend into said grooves in the side surfaces of said upper lid when said slide shutter and upper lid are in their respective closed positions so that said flanges of the slide shutter and said grooves in the side surfaces of the upper lid constitute said means for locking said upper lid in its closed position.

* * * * *